May 19, 1936.    S. M. D. MILLER    2,040,866
PEDAL ATTACHMENT
Filed Jan. 23, 1935
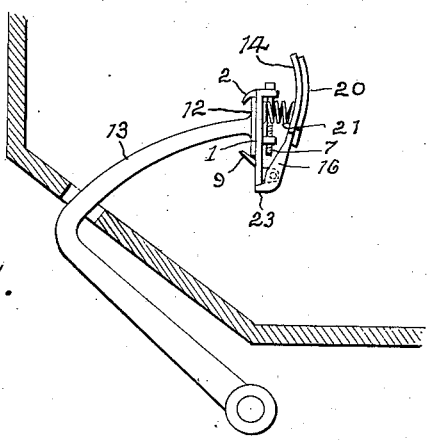
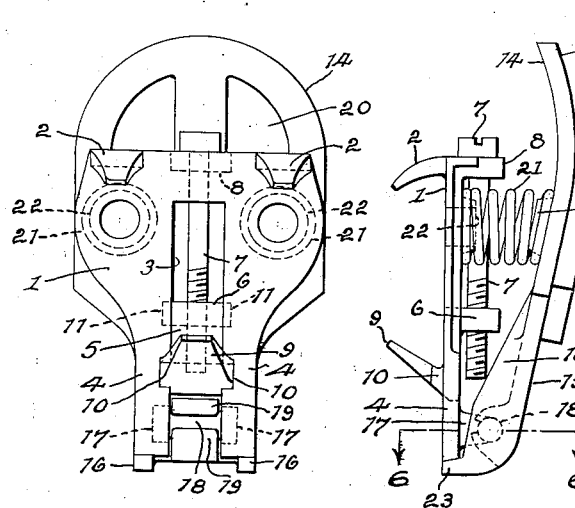
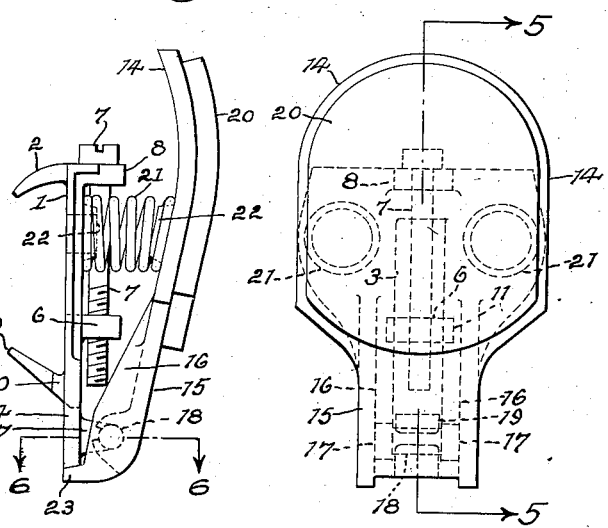
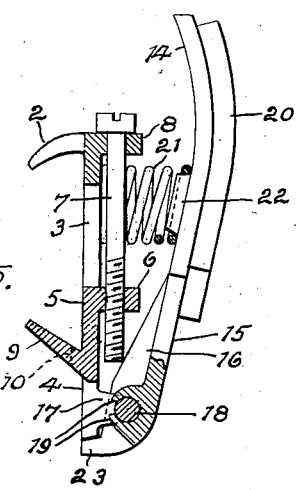
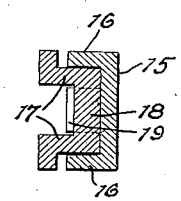
INVENTOR.
Samuel M. D. Miller,
BY
ATTORNEYS Patented May 19, 1936

2,040,866

UNITED STATES PATENT OFFICE 2,040,866

PEDAL ATTACHMENT

Samuel M. D. Miller, Detroit, Mich.

Application January 23, 1935, Serial No. 3,010

8 Claims. (Cl. 74—563)

This invention relates to an attachment for the control pedal or pedals of a motor vehicle, and its object is to provide a device which may be readily attached to the tread portion of a control pedal arm and which device includes a pivoted tread member to move with a yielding action relative to the pedal tread when the pedal is operated by placing the foot upon this tread member, thereby providing an additional yielding action in engaging the clutch or setting the brakes operated by such pedal, to prevent the clutch from grabbing or the too sudden action of the brakes.

A further object is to provide such a device with a convenient means for rigidly and detachably attaching the same to any of the ordinary forms of foot pedal having a tread or head, and in a manner whereby the pivoted tread member of said device will be held in superposed spaced relation to the pedal tread, and to provide yieldable means beneath this pivoted tread, whereby said tread will yield under foot pressure imposed thereon in operating said treadle.

It is also an object to provide said attachment with means for limiting the pivotal movement of its tread member and to provide a strong, compact structure of a size and form particularly adapting it for attachment to a pedal and embodying certain other new and useful features in its construction affording cheapness in manufacture and assembly.

With the above and other ends in view, the invention resides in the matters hereinafter set forth, reference being had to the accompanying drawing wherein:

Figure 1 is a side elevation of a device illustrative of an embodiment of the invention and showing the same as applied in use, to a pedal;

Fig. 2 is a side elevation of the device detached;

Fig. 3, a plan view of the device;

Fig. 4, an inverted plan view of the same;

Fig. 5, a longitudinal section upon the line 5—5 of Fig. 3, and

Fig. 6 is a transverse sectional detail on the line 6—6 of Fig. 2.

This device or attachment comprises a base or frame 1 which is provided at one end with downwardly projecting spaced apart lugs or hooks 2 and with a longitudinal central slot 3 dividing the lower end of the base into two arms 4, and within said slot is mounted a slide 5 having an upwardly extending lug 6 provided with a screwthreaded hole to receive the screwthreaded end of a screw bolt 7 which passes loosely through a hole in an upstanding lug 8 on the base between the hooks 2. On the end of said slide opposite that provided with the lug 6, is a downwardly extending hook 9 and side portions 10 of which underlie the base at the sides of the slot, and side portions 11 of the lug 6 overlie the base at the sides of said slot, so that said slide is guided and fixed within said slot when moved longitudinally by the turning of said screw 7 by means of its head in engagement with the outlet side of said lug 8. This base 1 may therefore be firmly clamped flat upon the tread or head 12 of a pedal 13 by engaging the hooks 2 over the upper end edge of said tread with the hook on said slide in engagement with the lower edge of said tread and then turning the screw to move the hook 9 toward the hooks 2. As the hooks are three in number, they will engage and firmly secure the base in place regardless of the outline of the pedal head or tread portion.

A tread member, indicated as a whole by the numeral 14 is pivotally attached at one end to the lower ends of the base arms 4 by forming said member with an end extension 15 having side flanges 16 to engage the outer sides of upstanding lugs 17 on the arms 4, said lugs being connected by an integral pivot pin 18, and providing downwardly projecting lips 19 on said extension between said flanges at opposite sides of said pin, which lips, in the assembly of the device, are bent around said pin, said lips and pin thus forming a pivot for said tread member without the necessity for machining the parts, said ears and pin being cast on the base and said lips being cast straight on the tread member and then bent over the pin in assembling, thus greatly cheapening the cost of manufacture and assembly and permanently and pivotally connecting the parts against becoming disconnected in use.

The tread member 14 is broadened out above the extension 15 and shaped for the securing thereon by cementing or otherwise, of a pad 20 formed of rubber or other suitable material to be engaged by the driver's foot and prevent slipping, and to yieldingly swing the tread member away from the base, two short coiled springs 21 are interposed between said base and member, each of which is formed with seats for the ends of said springs surrounding short studs 22 projecting a short distance into said ends to hold said springs against slipping out of place.

To limit the turning of the tread member away from said base under the action of said springs and thus normally hold the springs slightly compressed, the lower ends of the flanges 16 are formed with stop lugs 23 to engage the extreme ends of the arms 4 on the base beyond the pivot pin 18 and thus normally hold the tread member with its tread spaced a definite distance from the base but free to swing on its pivot toward said base against the action of said springs when foot pressure is applied to said tread to operate the pedal.

While coiled springs have been shown for the purpose of providing a yielding action of said tread relative to said base and pedal, it is obvious that any other form of spring may be employed to cushion the clutch engagement when this device is attached to a clutch pedal of a motor vehicle, or to graduate the setting of the brakes when attached to the brake pedal, and this device provides for its quick and convenient attachment to any pedal having any form of tread or head, said base with its hooks 2 and said slide 5 with its hook 9 forming a clamp operated by the screw bolt 7 to rigidly attach the device directly to the pedal tread with the tread member of the device positioned over the pedal tread, supplanting its use but engaged by the operator's foot in exactly the same manner as said pedal tread.

As commonly constructed, the clutch mechanism and also the brake mechanism of motor vehicles, each embody yieldable means, such as a spring or springs for normally holding the clutch in engagement and, in a brake mechanism for normally holding the brakes out of engagement, each mechanism being operated by a foot pedal, the clutch pedal being depressed against the action of the yieldable means which holds the clutch engaged, to disengage the clutch, and the brake pedal being depressed against the action of the spring which normally holds the brakes out of engagement, to set the brakes. The foot pressure applied to the brake pedal through the present attachment, provides an additional yielding action in setting the brakes, providing a cushioning effect which prevents a too sudden application of the brakes or grabbing in their ordinary operation but does not prevent such sudden application in case of emergency. Where the present attachment is applied to the clutch pedal, the operation of springs of the clutch mechanism in engaging the clutch through the gradual removal of pressure on said pedal, is cushioned, particularly at the end of the engaging operation, and sudden engagement and grabbing of the clutch is prevented, thus preventing the too sudden application of power with consequent strains and injury to tires and other parts of the vehicle.

The present invention provides an attachment which is simple in construction, cheap to manufacture, and may be quickly and conveniently attached to any pedal of the ordinary construction and requires no change in the manner of operating the pedal or in the position of the operator's foot.

Having thus fully described my invention, what I claim is:

1. An attachment for the operating pedal of a motor vehicle, including a base member, means for securing said base member to the tread portion of a pedal, a tread member pivotally attached at one end to the lower end of said base member, and yieldable means interposed between said base member and said tread member.

2. An attachment for the operating pedal of a motor vehicle, including a base member, means for securing said base member to the tread portion of a pedal, a tread member pivotally attached at one end to the lower end of said base member, yieldable means interposed between said base member and said tread member, and stop means for limiting the turning movement of said tread member away from said base member under the action of said yieldable means.

3. An attachment for the operating pedal of a motor vehicle, including clamping means for detachably securing said attachment to the tread portion of a pedal, and pivoted yieldable means in superposed relation to said tread portion to receive the pressure of the operator's foot in operating the pedal.

4. A device for the purpose described comprising a tread member detachably attached to a tread member of an operating pedal of a motor vehicle in superposed relation thereto and comprising two pivotally connected parts, and yieldable means interposed between said parts for turning one part of said tread member upon its pivot in a direction away from said tread member of said pedal and to yield under pressure in operating said pedal.

5. A device for attachment to the operating pedal of a motor vehicle, said device including a base member having a projection at one end to engage one side of the tread portion of a pedal, a slide on said base having a projection to engage the opposite side of said pedal tread, means for moving said slide to clamp said pedal tread between said projection, a tread member pivotally attached to said base member, and a spring interposed between said base member and tread member.

6. A device for attachment to the tread portion of a motor vehicle operating pedal and comprising a base, clamping means on said base for detachably securing the same to a pedal tread member, upstanding lugs on said base formed integral therewith and with a connecting pin, a tread member formed with downwardly projecting lugs to engage opposite sides of said pin and bendable thereover to pivotally attach said tread member to said base, and yieldable means interposed between said base and tread member.

7. A device for attachment to the tread portion of a motor vehicle operating pedal and comprising a base, clamping means on said base for detachably securing the same to a pedal tread member, a tread member pivotally attached to said base adjacent one end and formed with end lugs on its lower end to engage the lower end of said base and limit the turning movement of said tread member upon its pivot away from said base, and spring means to normally hold said tread member turned to the limit of its turning movement as determined by said lugs.

8. A device for attachment to the operating pedal of a motor vehicle, said device comprising a base provided with hooks projecting downwardly therefrom adjacent one end thereof and formed with a central longitudinal slot, a slide moveable within said slot and provided with a downwardly extending hook in opposed relation to said hooks on said base, a screw bolt for moving said slide, said base being also formed adjacent its lower end with upstanding lugs connected by an integral transverse pin, a tread member formed with downwardly projecting side flanges to engage the outer sides of said lugs and with projecting bendable lips between said flanges to engage opposite sides of said pin and to be bent thereover to pivotally attach said tread member to said base, studs on said base and lower side of said tread member, and coiled springs engaged at their ends over said studs to hold said springs in place between said base and tread member.

SAMUEL M. D. MILLER.